United States Patent Office 3,217,005
Patented Nov. 9, 1965

3,217,005
3-AMINO-4(3H)-QUINAZOLINONES
AND PROCESS
Frederick K. Kirchner, Bethlehem, and Andrew W. Zalay,
Albany, N.Y., assignors to Sterling Drug Inc., New
York, N.Y., a corporation of Delaware
No Drawing. Filed Nov. 5, 1963, Ser. No. 321,448
12 Claims. (Cl. 260—256.4)

This invention relates to novel heterocyclic organic compounds and to processes for their preparation.

In particular, the invention is concerned with 3-substituted-amino-4(3H)-quinazolinones which have useful pharmacological properties.

One aspect of the invention resides in a compound depictable by the Formula I

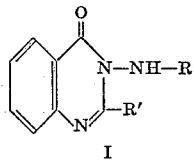

wherein R is phenyl and R' is a member of the group consisting of ω-carboxy-lower-alkyl and ω-carboxy-lower-alkenyl, preferably of from 3–6 carbon atoms.

Another aspect of the invention resides in the process of preparing a compound of Formula I which comprises reacting an N-anthraniloyl-N'-phenylhydrazine with a lower-aliphatic dicarboxylic acid cyclic anhydride. The lower-aliphatic dicarboxylic acid cyclic anhydride contains, as the ring members, besides the anhydride oxygen atom, 4–5 ring carbon atoms, and the anhydride ring can be saturated or unsaturated. For example, suitable lower-aliphatic dicarboxylic acid cyclic anhydrides include maleic anhydride, citraconic anhydride, succinic anhydride, methylsuccinic anhydride, glutaric anhydride, α- or β-methylglutaric anhydride and the like.

In Formula I R is phenyl, the benzene ring of which can be unsubstituted or can bear one or more substituents of low molecular weight. Suitable substituents should be unreactive toward other functional groups in the molecule, and where there is more than one substituent, they can be in any of the possible position combinations relative to each other. Examples of such substituents include carboxyl, lower-alkyl, halo, lower-alkoxy, hydroxyl, lower-alkylmercapto, lower-alkanesulfonyl, lower-alkanoylamino, trifluoromethyl, and the like.

In Formula I, when representing ω-carboxy-lower-alkyl, R' contains 3–6 carbon atoms. For example, the term represents 2-carboxyethyl and 3-carboxypropyl. When representing ω-carboxy-lower-alkenyl, R' contains 3–6 carbon atoms and a double bond. For example, the term represents 2-carboxyvinyl and 2-carboxy-2-methylvinyl.

The compounds of Formula I are prepared by heating together the appropriate N-anthraniloyl-N'-phenylhydrazine and respectively a lower-alkane-dicarboxylic acid anhydride or a lower-alkene-dicarboxylic anhydride at a temperature above the melting point of the acid anhydride. The preferred temperature range is 75°–175° C.

The compounds of Formula I wherein R' is carboxy-lower-alkyl can also be prepared by catalytic reduction of the corresponding compounds wherein R' is carboxy-lower-alkylene. The reduction takes place readily under standard reducing conditions in the presence of such catalysts as Raney nickel or platinum oxide.

A further aspect of the invention resides in a compound depictable by the Formula II

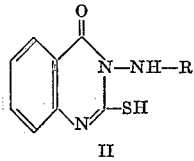

wherein R is as described above in Formula I. A compound of Formula II can be prepared by reacting an N-anthraniloyl-N'-phenylhydrazine with carbon disulfide. This reaction is conducted by heating the reactants in an inert solvent, for example toluene, pyridine, or a lower aliphatic alcohol. Alternatively, an excess of carbon disulfide may be employed as a solvent. The preferred temperature range for this reaction is 45–145° C.

Another aspect of the invention resides in a compound depictable by the Formula III

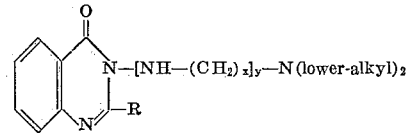

wherein X is an integer of 2–4 inclusive, Y is an integer of 0–1 inclusive, R is a member of the group consisting of H and lower-alkyl, and the lower alkyl groups contain from 1 to 4 carbon atoms.

The compounds represented by Formula III wherein Y is 0 can be prepared by reacting N,N-di-(lower-alkyl)-N'-anthraniloylhydrazine with formic acid or a lower-alkyl orthoformate, e.g. ethyl orthoformate, (where R=H) or with a lower-alkanoic orthoester, a lower-alkanoic anhydride, or a lower-alkanoic acid-halide (where R=lower-alkyl). The reaction is conducted by heating a mixture of the reactants for a period of time ranging from a few minutes to several hours, depending upon the nature of the reactants and upon the reaction temperature. The preferred reaction temperature range is 60–100°. The reaction may be conducted in an inert solvent, such as a lower-alkanol, benzene, chloroform, and the like, but we usually prefer to use an excess of formic acid or a lower-alkyl orthoester as a solvent.

The compounds represented by Formula III wherein Y is 1 can be prepared by alkylating 3-amino-2-R-4(3H)-quinazolinone with di-(lower-alkyl)amino-polymethylene halides containing from 2 to 4 methylene groups, i.e., compounds of the formula (lower-alkyl)$_2$-N-(CH$_3$)$_x$-halogen wherein X=2–4. The product obtained by the direct combination of the above reactants in a suitable inert solvent is the hydrogen halide salt of the requisite 3-[di-(lower-alkyl)amino-polymethyleneamino]-4-(3H)-quinazolinone because of the concomitant formation of one molecular equivalent of hydrogen halide. The reaction can be conducted in the presence of an acid acceptor (e.g. sodium carbonate), whereupon the compound, in free base form can easily be obtained. An acid-addition salt form of a compound of Formula III, whether it be with an organic or inorganic acid, is the full equivalent of the corresponding free base form in so far as its physiological properties are concerned.

Suitable inert solvents for the reaction described above include lower-alkanols, benzene, toluene, lower-alkoxy-lower-alkanols, and the like. The preferred reaction temperature range is 50–150° C.

In the same manner 3-(4-carboxyanilino)-4(3H)-quinazolinone can be prepared from N-anthraniloyl-N'-(4-carboxyphenyl)hydrazine and formic acid or a lower-alkyl orthoformate.

Still another aspect of the invention resides in a compound depictable by the Formula IV

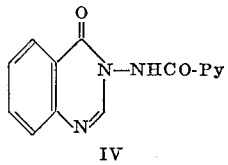

IV wherein Py is pyridyl which is bonded to the rest of the molecule through any available carbon atom in the ring. Hence, the term Py includes members of the group consisting of 2-, 3-, and 4-pyridyl groups.

The compounds represented by Formula IV can be prepared by acylating 3-amino-4(3H)-quinazolinone with hydrazine with formic acid or with a lower-alkyl orthoformate (e.g. ethyl orthoformate). The reaction can be conducted by refluxing the reactants in a suitable inert solvent, or excess formic acid or lower-alkyl orthoformate can be used as a solvent.

Alternatively, the compounds of Formula IV can be prepared by acylating 3-amino-4(3H)1quinazolinone with a pyridine carboxylic acid halide or pyridine acid anhydride in the conventional manner.

The anthraniloylhydrazine compounds used as starting materials in the several preparative procedures described above are prepared from the appropriately-substituted-hydrazine compounds and isatoic anhydride, according to known methods. Isatoic anhydrides bearing substituents on the benzo-ring are known to the art. Insofar as the particular substituents do not react chemically with other functional groups in the molecule, such substituted isatoic anhydrides are equivalent to unsubstituted isatoic anhydride for the purpose of preparing compounds of this invention wherein the benzo-portion of the quinazolinone ring bears substituents. Examples of the known substituted isatoic anhydrides include 6-chloroisatoic anhydride, 6-nitroisatoic anhydride, 6-chloro-8-nitroisatoic anhydride, and the like.

Specific embodiments of the invention as illustrated in Formulas I, II, III and IV above have been tested by standard pharmacological screening procedures and have been found to have useful pharmacological properties. In particular, they have a potentiating effect on the hypnotic action of barbiturates, and they have anticonvulsant properties. Their use is thus indicated in the treatment, or as adjuvants in the treatment of insomnia, convulsions, and mental disturbances.

The structures of the compounds of the invention were determined by their mode of synthesis, by infrared spectral analysis, and by the correspondence of calculated and found values of elemental analysis of representative samples.

The examples which follow will further illustrate the invention without the latter being limited thereto.

*Example 1.—3-anilino-2-mercapto-4(3H)-quinazolinone*

A solution containing 22.7 grams (0.1 mole) of N-anthraniloyl-N'-phenylhydrazine and 25 ml. of carbon disulfide in 120 ml. of pyridine was refluxed overnight. The excess carbon disulfide was evaporated, and the mixture was poured into 100 ml. of water. The crystals which precipitated were washed well with water and with methanol, and then were recrystallized from acetone. The pure 3-anilino-2-mercapto-4(3H)-quinazolinone thus prepared melted at 237.2–245.0° C. (corr.).

*Example 2.—3-(4-carboxyanilino)-2-mercapto-4(3H)-quinazolinone*

Following the foregoing procedure, N-anthraniloyl-N'-(4-carboxyphenyl)hydrazine was reacted with carbon disulfide. The 3 - (4-carboxyanilino)-2-mercapto-4(3H)-quinazolinone thus prepared melted above 300° C. (corr.).

*Example 3.—3-(3dimethylaminopropylamino)-4(3H)-quinazolinone hydrochloride*

To a solution containing 16.1 grams (0.1 mole) of 3-amino-4(3H)-quinazolinone dissolved in 150 ml. of commercial ethoxyethanol, preheated to a temperature of 100° C., was added 0.14 mole of dimethylaminopropyl chloride. The mixture was allowed to stand and cool to room temperature. The product was collected and recrystallized twice from 300 ml. of methanol containing activated charcoal. The pure 3-(3-dimethylaminopropylamino)-4(3H)-quinazolinone thus prepared melted with decomposition at 205.2–219.4° C. (corr.).

Following the above procedure there can also be prepared:

3 - (2 - diethylaminoethylamino)-4(3H)-quinazolinone from 3-amino-4(3H)-quinazolinone and diethylaminoethyl chloride;

3 - (4-dimethylaminobutylamino)-4(3H)-quinazolinone from 3-amino-4(3H)-quinazolinone and dimethylaminobutyl bromide; and 3 - [4-di-(n-butyl)aminobutylamino]-4(3H) - quinazolinone from 3-amino-4(3H)-quinazolinone and di-(n-butyl)aminobutyl chloride.

*Example 4.—3-(4-carboxyanilino)-4(3H)-quinazolinone*

A solution containing 9.5 grams (0.035 mole) of N-anthraniloyl-N'-(4-carboxyphenyl)hydrazine was heated on a steam bath in 10 ml. of formic acid for several minutes and allowed to cool. The mixture was then diluted with water and the white crystalline product was collected and recrystallized from aqueous formic acid. The pure 3-(4-carboxyanilino)-4(3H)-quinazolinone thus prepared melted at 295.2–298.8° C. (corr.).

*Example 5.—3-anilino-2-(2-carboxyvinyl)-4(3H)-quinazolinone*

N-anthraniloyl-N'-phenylhydrazine (11.4 grams, 0.05 mole) and maleic anhydride (5 grams, 0.05 mole) were melted together on an oil bath at 150° C. for one hour. The melt was allowed to cool and solidify and was then crystallized from methanol. The product was then recrystallized twice from aqueous dioxane. The pure 3-anilino - 2 - (2-carzoxyvinyl)-4(3H)-quinazolinone thus prepared melted with decomposition at 217.0–217.4° C. (corr.).

*Example 6.—3-anilino-2-(2-carboxyethyl)-4(3H)-quinazolinone*

Following the foregoing procedure N-anthraniloyl-N'-phenylhydrazine was reacted with succinic anhydride at 150° for 0.5 hour. Purified by triturating the crude product with methanol, dissolving the crystalline product in 5% sodium bicarbonate solution, and precipitating the product with acid, the 3-anilino-2-(2-carboxyethyl)-4(3H)-quinazolinone thus prepared melted at 181.8–183.6° C. (corr.)

3-anilino-2-(2-carboxyethyl)-4(3H)-quinazolinone is also prepared by hydrogenation of 3-anilino-3-(2-carboxyethylene)-4(3H)-quinazolinone in a bottle-type hydrogenator in the presence of Raney nickel catalyst.

Following the procedure of Example 5 there can also be prepared:

3 - (4 - chloroanilino)-2-(3-carboxypropyl)4(3H)-quinazolinone from N-anthraniloyl-N'-(4-chlorophenyl)hydrazine and glutaric anhydride; and 3 - (4 - ethylanilino) - 2 - (2 - carboxy-2-methylvinyl)-4(3H)-quinazolinone from N-anthraniloyl-N'-(4-ethylphenyl)-hydrazine and citraconic anhydride.

*Example 7.—3-isonicotinoylamino-4(3H)-quinazolinone*

A solution of 10.25 grams (0.04 mole) of N-anthraniloyl-N'isonicotinoyl hydrazine in 7.5 ml. of formic acid was heated on the steam bath for one-half hour. The mixture was cooled, diluted with 10 ml. of water, and the product was collected and washed with water and methanol. Recrystallized from methanol the pure 3-isonicotinoylamino-4(3H)-quinazolinone thus prepared melted at 205.6–206.6° C. (corr.)

Following the above procedure, there can also be prepared:

*3-nicotinoylamino-4(3H)-quinazolinone* from N-anthraniloyl-N'-nicotinoylhydrazine and ethyl orthoformate;

*3-picolinoyl-4(3H)-quinazolinone* from N-anthraniloyl-N'-picolinoylhydrazine and formic acid; and

*3 - (6 - methylpicolinoyl) - 4(3H) - quinazolinone* from N-anthraniloyl-N'-(6-methylpicolinoyl)hydrazine and formic acid.

*Example 8.—3-dimethylamino-4(3H)-quinazolinone*

A solution containing 9.0 grams (0.05 mole) of N-anthraniloyl-N',N'-dimethylhydrazine in 20 ml. of absolute ethanol and 20 ml. of ethyl orthoformate was heated to boiling on a hot plate, distilling out the solvents. When the temperature of the solution reached 150° the mixture was concentrated in vacuo. The resulting yellow oil was crystallized from benzene and recrystallized from aqueous methanol. The pure 3-dimethylamino-4(3H)-quinazolinone thus prepared melted at 68.2–69.2° C. (corr.)

Following the above procedure, there can also be prepared:

*3-dimethylamino-2-methyl-4(3H)-quinazolinone* from N-anthraniloyl-N',N'-dimethylhydrazine and ethyl orthoacetate;

*3 - diethylamino - 2-propyl-4(3H)-quinazolinone* from N-anthraniloyl-N',N'-diethylhydrazine and butyric anhydride in benzene, and

*3 - dibutylamino - 2 - ethyl - 4(3H)-quinazolinone* from N-anthaniloyl-N',N'-dibutylhydrazine and propionyl chloride in chloroform.

We claim:
1. A compound of the formula

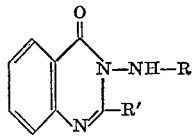

wherein R is phenyl and R' is a member of the group consisting of ω-carboxy-lower-alkyl and α-carboxy-lower-alkenyl.

2. A compound of the formula

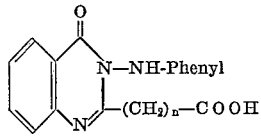

wherein $n$ is an integer of 2–3.

3. 3 - anilino-2-(2-carboxyvinyl)-4(3H)-quinazolinone.
4. 3 - anilino-2-(2-carboxyethyl)-4(3H)-quinazolinone.

5. A compound of the formula

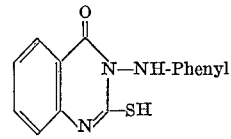

6. 3 - (4 - carboxyanilino)-2-mercapto-4(3H)-quinazolinone.

7. A compound of the formula

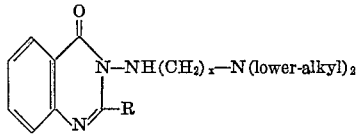

wherein $x$ is an integer of 2–4 and R is a member of the group consisting of H and lower-alkyl.

8. 3 - (3 - dimethylaminopropylamino)-4(3H)-quinazolinone hydrochloride.
9. 3-(4-carboxyanilino)-4(3H)-quinazolinone.
10. A compound of the formula

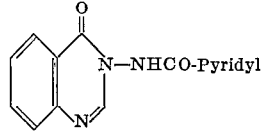

11. 3-isonicotinoylamino-4(3H)-quinazolinone.
12. The process for preparing a compound of the formula

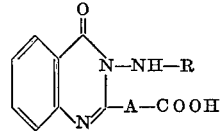

which comprises reacting a compound of the formula

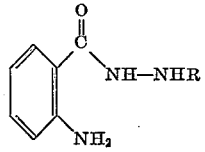

with a cyclic anhydride of the formula

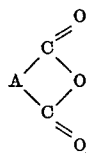

wherein R is phenyl and A is lower alkylene or lower alkenylene of 2–5 carbon atoms.

References Cited by the Examiner
FOREIGN PATENTS
614,243  8/62  Belgium.

NICHOLAS S. RIZZO, *Primary Examiner.*